May 29, 1934. C. F. WHITE 1,960,284
VALVE FOR HYDRAULIC SYSTEMS
Filed Oct. 28, 1932
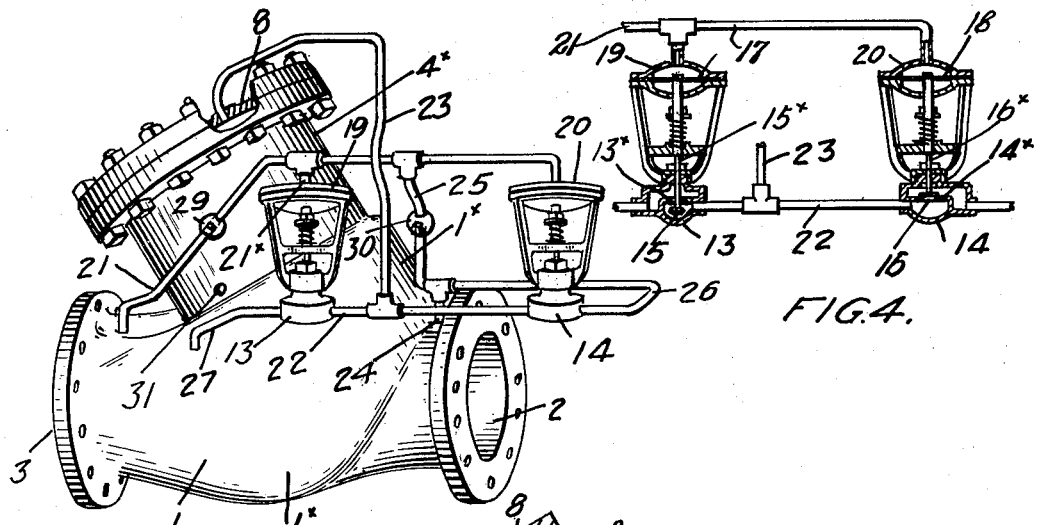
FIG.1.
FIG.4.
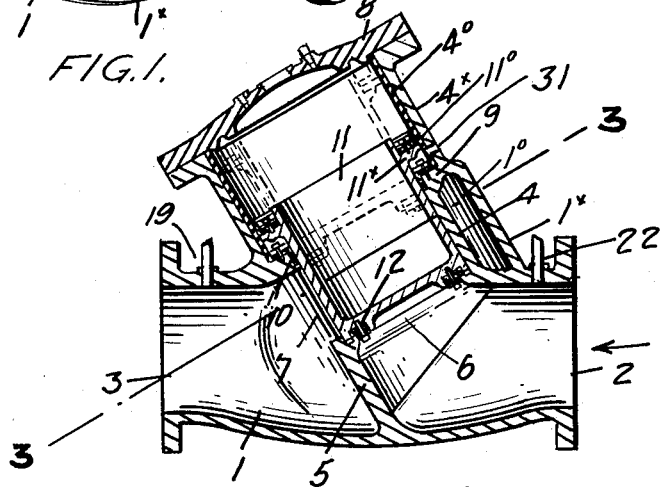
FIG.2.
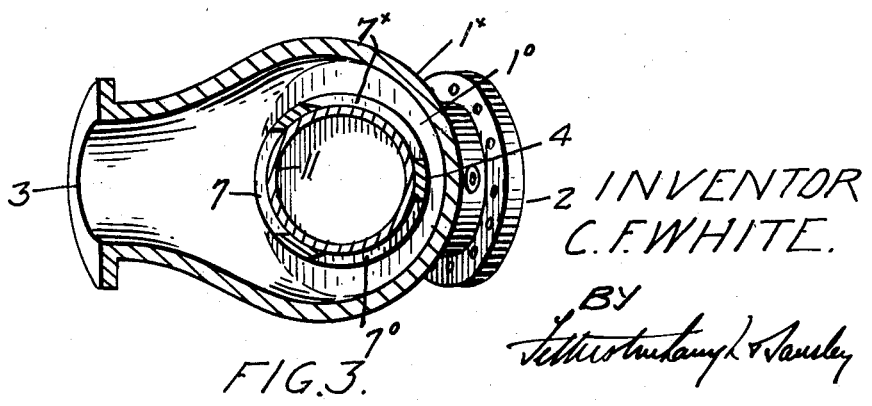
FIG.3.
INVENTOR
C. F. WHITE.
BY
ATTORNEYS.

Patented May 29, 1934

1,960,284

UNITED STATES PATENT OFFICE 1,960,284

VALVE FOR HYDRAULIC SYSTEMS

Charles Frederick White, Toronto, Ontario, Canada

Application October 28, 1932, Serial No. 640,121

1 Claim. (Cl. 137—139)

My invention relates to improvements in valves for hydraulic systems, and the object of the invention is to devise a valve which will decrease the cost of operation of an hydraulic system by decreasing the resistance to the fluid flow through the open valve and the resistance of valve operation to a minimum and at the same time will provide a valve which may be opened and closed by changes in fluid pressure in the system, in which means are provided for automatically opening and closing the valve and in which manually settable means are provided whereby the automatic means may be operated either by a change of pressure in the system at the inlet or outlet side of the valve as desired, and it consists essentially of the arrangement and construction of parts as hereinafter more particularly explained.

Fig. 1 is a perspective view of my valve and the mechanism for automatically operating the valve by changes in fluid pressure.

Fig. 2 is a longitudinal sectional view through the valve body illustrated in Fig. 1.

Fig. 3 is a sectional plan view on line 3—3 Fig. 2.

Fig. 4 is a sectional detail through the actuating valves of the automatic mechanism.

In the drawing like letters of reference indicate corresponding parts in each figure.

1 is the main valve casing having an inlet end 2 and an outlet end 3. 4 is a cylindrical valve chamber which is inclined in the direction of fluid flow through the valve and is formed integral with the valve body. The lower end of the chamber is extended downward as indicated at 5 to form the dividing wall extending transversely of the valve between the inlet and outlet end thereof, such dividing wall being inclined in the direction of fluid flow so as to prevent any pocketing of the fluid and permitting its free upward flow through the valve seat 6, such valve seat inclining downward from the top of the valve casing 1 also in the direction of fluid flow and forming the bottom of the valve chamber 4.

The valve chamber 4 is provided with ports 7, 7× and 7° arranged around its periphery. The valve casing 1 is provided with an enlargement 1× forming the fluid chamber 1° which gradually increases in area from the inlet side of the valve towards the outlet side and thereby directing the fluid flow from the ports 7× and 7° to the casing outlet 3. The valve chamber 4 is provided at its upper end with an enlargement 4× provided with a closing cap 8 to form a pressure chamber provided at its lower end with an annular shoulder 9.

10 is a packing secured to the shoulder 9 to fit the valve 11 operating within the chamber 4. The lower end of the valve 11 is provided with a leather washer 12 engaging the valve seat 6 when the valve 11 is in its closed position. The upper end of the valve 11 is provided with an enlargement 11× having a leather packing 11° fitting the lining 4° of the enlargement 4× forming a pressure chamber above the valve.

It will thus be seen that by reason of the larger area on the upper face of the valve 11 the same pressure which is exerted upward against the lower face of the valve will, when exerted downward against the upper face of the valve, serve to close the valve against such upward pressure and hold it closed until the downward pressure is relieved.

When the valve 11 is in the open position as indicated by dotted lines in Fig. 2 a direct, free and unimpeded fluid flow will be provided, the upper portion of the fluid stream passing horizontally through the inclined open valve seat 6 and inclined port 7. The lower portion of the stream is directed upward as before stated by the inclined wall 5 through the port 6, such upward flow creating extra pressure which is relieved by the side ports 7× and 7°. By the above arrangement the fluid pressure on the exterior periphery of the valve 11 is equalized therearound preventing the valve being forced sideways against the wall of the valve chamber 4 to create friction and thereby permitting of a free floating up and down movement of the valve between its open and closed positions.

I will now describe the means by which the valve 11 is automatically operated by a change of the fluid pressure in the valve casing 1.

When the fluid pressure is normal in the valve casing 1, the valve 11 is in the open position indicated by dotted lines in Fig. 2. 13 and 14 are actuating valves, the seat 13× of the valve 13 being directed downward and the seat 14× of the valve 14 directed upward.

15 and 16 are valve heads coacting with the seats 13× and 14×, the valve 13× being open and the valve 14× being closed when the valve 11 is in the open position above referred to. The heads 15 and 16 are provided with stems 15× and 16× connected to diaphragms 17 and 18 of the pressure chambers 19 and 20.

I do not describe the construction of these valves further as they are of common construction and are merely utilized for the purpose desired.

21 is a pipe leading from the outlet end of the valve casing 1 to the pressure chamber 20. The pipe 21 is provided with a branch 21× leading to the pressure chamber 19. 22 is a pipe connecting the inlet end of the valve 14 with the inlet end of the valve 13. 23 is a pipe connected at one end to the pipe 22 and leading at its opposite end through the cap 8 into the pressure chamber 4×. 24 is a pipe leading from the inlet end of the casing 1 and connected by a pipe 25 to the pipe 21 and by a pipe 26 to the outlet end of the valve casing 14. 27 is a drain pipe leading from the outlet end of the valve casing 13.

29 and 30 are manually operated shut off valves located respectively in the pipes 21 and 25. The valve 11 may be operated either by change of pressure in the inlet end 2 of the casing 1 or by change of pressure at the outlet end 3.

If it is desired to be controlled by change of pressure at the inlet end 2 of the casing 1, the valve 30 is opened and the valve 29 closed manually, the pressure then passes through the pipes 24, 25 and 21 into the pressure chambers 19 and 20 operating against the upper faces of the diaphragms 17 and 18, the valve 16 then assuming the closed position illustrated in Fig. 4 and the valve 15 the open position. When the valves 15 and 16 assume the above positions the water pressure from the valve casing 1 to the pressure chamber 4× is cut off by the closed valve 16 from passing through the pipes 22 and 23 leading to the pressure chamber and simultaneously the water contained in the pressure chamber is exhausted through the pipes 23 and 22 leading to the open valve 13 and through such valve to the drain pipe 27. The pressure against the upper face of the valve 11 is thereby relieved and the pressure in the valve casing 1 at the inlet end then acts against the lower face of the valve 11 to force it upward to the open position indicated by dotted lines in Fig. 2.

When, for any reason, the pressure at the inlet end is decreased the pressures against the diaphragms 17 and 18 are also decreased carrying the valve 16 to the open position and the valve 15 to the closed position. The closed valve 15 closes the exhaust from the pressure chamber 4×, pressure from the inlet 2 then passing through the pipes 22 and 21 through the open valve 16 and pipes 22 and 23 to the pressure chamber to operate against the large end of the valve 11 to overcome the same pressure against the small end of the valve and carry it to the closed position.

When the normal pressure is again restored the valve 16 is closed and the valve 15 opened removing the pressure against the upper end of the valve 11, the normal pressure then acting against the lower end of the valve 11 to open it.

When it is desired to operate the valve by change of pressure at the outlet end 3, the valve 30 is closed and the valve 29 opened, the operation of the valves 15 and 16 being then the same as that previously described. In order to permit of the free longitudinal movement of the valve 11, a vent hole 31 is provided in the wall of the pressure chamber between the shoulder 9 and the enlarged upper end 11× of the valve so that there will be free passage of air in and out of the space formed between these portions as the valve moves upward or downward.

From this description it will be seen that I have devised a valve for hydraulic systems in which the fluid flow will be practically unimpeded and, therefore, provide a flow which will require a minimum amount of power for its movement and thereby cheapen the cost of operation, and in which the valve is operated automatically by changes of pressure either at the inlet or outlet side of the valve as desired by the operator.

What I claim as my invention is:

In a valve for hydraulic systems, the combination with the body of the valve casing, of a cylindrical portion inclined in the direction of fluid flow, a valve seat located in such cylindrical portion and inclined downwardly from the top of the casing body to form the bottom of the valve chamber, ports in the wall of the valve chamber located above the valve seat, a valve operating within the valve chamber and coacting with the valve seat, and manually adjustable means for automatically operating the valve by fluid pressure either at the inlet or outlet end of the valve casing.

CHARLES FREDERICK WHITE.